(12) United States Patent
Vetter et al.

(10) Patent No.: US 11,084,191 B2
(45) Date of Patent: Aug. 10, 2021

(54) METHOD OF MANUFACTURING A WOOD-BASED BOARD AND SUCH A WOOD-BASED BOARD

(71) Applicant: Välinge Innovation AB, Viken (SE)

(72) Inventors: Georg Vetter, Viken (SE); Niclas Håkansson, Viken (SE); Marcus Bergelin, Lerberget (SE); Hans Persson, Perstorp (SE)

(73) Assignee: VALINGE INNOVATION AB, Viken (SE)

( * ) Notice: Subject to any disclaimer, the term of this patent is extended or adjusted under 35 U.S.C. 154(b) by 52 days.

(21) Appl. No.: 16/742,963

(22) Filed: Jan. 15, 2020

(65) Prior Publication Data
US 2020/0254657 A1 Aug. 13, 2020

Related U.S. Application Data

(63) Continuation of application No. 14/305,251, filed on Jun. 16, 2014, now Pat. No. 10,569,452.

(30) Foreign Application Priority Data

Jun. 17, 2013 (SE) .................................... 1350733-0

(51) Int. Cl.
*B29C 43/00* (2006.01)
*B29K 1/00* (2006.01)
(Continued)

(52) U.S. Cl.
CPC .............. *B29C 43/003* (2013.01); *B27N 3/08* (2013.01); *B27N 7/005* (2013.01); *B29C 43/305* (2013.01);
(Continued)

(58) Field of Classification Search
None
See application file for complete search history.

(56) References Cited

U.S. PATENT DOCUMENTS 5,134,023 A 7/1992 Hsu
6,318,989 B1 11/2001 Bonomo et al.
(Continued)

FOREIGN PATENT DOCUMENTS

DE 10 2004 050 278 A1 4/2006
EP 1 250 995 A1 10/2002
(Continued)

OTHER PUBLICATIONS

International Search Report dated Sep. 19, 2014 in PCT/SE2014/050730, Patent-och registreringsverket, Stockholm, SE, 4 pages.
(Continued)

*Primary Examiner* — Benjamin A Schiffman
(74) *Attorney, Agent, or Firm* — Buchanan Ingersoll & Rooney P.C.

(57) ABSTRACT

A method of manufacturing a wood-based board. The method includes applying at least one first fibre mat including a first mix comprising lignocellulosic particles and a binder on a carrier, applying a second fibre mat including a second mix including cellulosic particles and a binder on said at least one first fibre mat, and pressing said at least one first fibre mat into a base layer and the second fibre mat into a surface layer simultaneously, thereby forming a wood-based board. Also, to such a wood-based board.

22 Claims, 2 Drawing Sheets

(51) Int. Cl.
*B27N 3/08* (2006.01)
*B27N 7/00* (2006.01)
*E04C 2/16* (2006.01)
*B29C 43/30* (2006.01)
*B29C 43/52* (2006.01)

(52) U.S. Cl.
CPC ............... *B29C 43/52* (2013.01); *E04C 2/16* (2013.01); *B29C 2795/007* (2013.01); *B29K 2001/00* (2013.01); *Y10T 428/31982* (2015.04)

(56) References Cited

U.S. PATENT DOCUMENTS

| | | |
|---|---|---|
| 9,573,343 B2 | 2/2017 | Pervan |
| 10,307,984 B2 | 6/2019 | Pervan |
| 10,569,452 B2 | 2/2020 | Vetter et al. |
| 10,967,608 B2 | 4/2021 | Pervan |
| 2002/0192401 A1 | 12/2002 | Matsumoto et al. |
| 2007/0256804 A1 | 11/2007 | Garcis Espino et al. |
| 2008/0134613 A1 | 6/2008 | Pervan |
| 2010/0132898 A1 | 6/2010 | Schoenhaber et al. |
| 2010/0300030 A1 | 12/2010 | Pervan et al. |
| 2010/0323187 A1 | 12/2010 | Kalwa |
| 2011/0177354 A1 | 7/2011 | Ziegler et al. |
| 2012/0017533 A1 | 1/2012 | Pervan et al. |
| 2012/0263965 A1 | 10/2012 | Persson et al. |
| 2013/0111845 A1 | 5/2013 | Pervan et al. |
| 2014/0090335 A1 | 4/2014 | Pervan et al. |
| 2014/0370319 A1 | 12/2014 | Vetter et al. |
| 2015/0017461 A1 | 1/2015 | Lindgren et al. |
| 2015/0343739 A1 | 12/2015 | Pervan |
| 2017/0120558 A1 | 5/2017 | Pervan |
| 2019/0248108 A1 | 8/2019 | Pervan |
| 2021/0129485 A1 | 5/2021 | Pervan |

FOREIGN PATENT DOCUMENTS

| | | |
|---|---|---|
| FR | 1.433.313 A | 4/1966 |
| GB | 984 170 A | 2/1965 |
| WO | WO 98/50207 A1 | 11/1998 |
| WO | WO 2006/042651 A1 | 4/2006 |
| WO | WO 2007/015669 A2 | 2/2007 |
| WO | WO 2007/015669 A3 | 2/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/129048 A1 | 10/2008 |
| WO | WO 2009/065769 A2 | 5/2009 |
| WO | WO 2009/065769 A3 | 5/2009 |
| WO | WO 2009/116926 A1 | 9/2009 |
| WO | WO 2010/087752 A1 | 8/2010 |
| WO | WO 2011/087422 A1 | 7/2011 |
| WO | WO 2011/129757 A1 | 10/2011 |

OTHER PUBLICATIONS

Extended European Search Report dated Jul. 24, 2017 in EP 14813901.7, European Patent Office, Munich, DE, 8 pages.
Pervan, Darko et al. (Author), Technical Disclosure entitled "Digital Printing and Embossing," IP com No. IPCOMM000224950D, Jan. 15, 2013, IP.com Prior Art Database, 89 pages.
Hata, T., et al., "Production of particleboard with steam-injection, Part 2: Computer simulation of temperature behavior in particle mat during hotpressing and steam-injection pressing", *Wood Science and Technology*, Mar. 1990, Summary pp. 2 only, vol. 24, Issue 1, Springer International Publishing AG, CH.

METHOD OF MANUFACTURING A WOOD-BASED BOARD AND SUCH A WOOD-BASED BOARD

CROSS REFERENCE TO RELATED APPLICATIONS

The present application is a continuation of U.S. application Ser. No. 14/305,251, filed on Jun. 16, 2014, which claims the benefit of Swedish Application No. 13507330, filed on Jun. 17, 2013. The entire contents of each of U.S. application Ser. No. 14/305,251 and Swedish Application No. 13507330 are hereby incorporated herein by reference in their entirety.

TECHNICAL FIELD

Embodiments of the present disclosure relate to a method of manufacturing a printable wood-based board, such as a MDF, HDF, OSB or particle board, and such a printable wood-based board.

TECHNICAL BACKGROUND

Conventional Medium Density Fibre boards (MDF), High Density Fibre boards (HDF) and particle boards generally have a brown colour, which may vary with the type of wood raw material used. MDF and HDF are often used as a core material to which a veneer or laminate such as DPL (Direct Pressure Laminate) or HPL (High Pressure Laminate) is adhered. An alternative to attaching a laminate is to print directly on a HDF or MDF in order to reduce cost. However, the colour of the MDF or HDF makes it difficult to print pale decors since the colour of the MDF or HDF shines through the printed décor. Accordingly, it is difficult to print a paler colour than the colour of the HDF or MDF. Furthermore, a comparable large amount of ink may be required to obtain the desired décor due to the underlying colour of the HDF or MDF, which increases the cost of the décor.

It is known from US 2007/0256804 to produce a white wood-based board of bleached wood fibres and/or combined with beater dyeing with a white pigment. However, using bleached wood fibres and pigment result in a board produced to a considerable higher cost compared to a conventional MDF or HDF.

GB 984,170 describes an improved chipboard, which may have a white surface comprising wood flour and titanium dioxide. The white surface is obtained by a large amount of titanium dioxide.

EP 1,250,995 discloses a method of extruding a thermoplastic composite material containing a thermoplastic resin and a vegetable filler.

SUMMARY

It is an object of at least certain embodiments of the present disclosure to provide an improvement over the above described techniques and known art.

A further object of at least certain embodiments is to provide a wood-based board having a pale to white or coloured surface.

A further object of at least certain embodiments is to provide a wood-based board, which is suitable for being printed directly upon.

A further object of at least certain embodiments is to provide a wood-based board having a printable surface at a low cost.

A further object of at least certain embodiments is to provide a wood-based board on which pale or bright decors may be printed directly upon.

At least some of these and other objects and advantages that will be apparent from the description have been achieved by a method of manufacturing a wood-based board according to a first aspect of the disclosure. The method comprises applying at least one first fibre mat comprising a first mix comprising lignocellulosic particles and a first binder on a carrier, applying a second fibre mat comprising a second mix comprising cellulosic particles and a second binder on said at least one first fibre mat, and pressing said at least one first fibre mat into a layer and the second fibre mat into a surface layer simultaneously, thereby forming a wood-based board.

The surface layer may be a top layer of the wood-based board.

Pressing preferably comprises applying heat and pressure. Pressing may comprise curing the first and second binder of the first and second fibre mat, respectively.

The second fibre mat is applied on said at least one first fibre mat prior to pressing said at least one first fibre mat, or at least prior to final pressing. In one embodiment, the second fibre mat is applied on said at least one first fibre mat prior to curing said at least one first fibre mat.

By lignocellulosic particles are meant particles comprising cellulose and/or hemicellulose and lignin. The particles may be wood fibres or vegetable fibres such as jute, linen, flax, hemp, bamboo, bagasse and sisal.

By cellulosic particles are meant particles comprising no or substantially no lignin (e.g., less than 5% lignin). The particles may be produced from wood, preferably wood fibres or vegetable fibres such as cotton.

In one embodiment, the surface layer comprises no pigment. The surface layer may be free from pigments. The surface layer may consist of cellulosic particles, a binder and, optionally, additives selected from hydrophobing agents, hardener, and catalysts.

An advantage of embodiments of the present disclosure is that a wood-based board having a pale to white surface is obtained. Thereby, the wood-based board is suitable for being directly printed on. The wood-based board is thereby also suitable for being used as a core for a surface layer being at least partly translucent. The wood-based board may also be used without any further treatment.

As a result of the pale to white colour of the surface layer of the wood-based board, a high quality print may be printed directly on the surface of the wood-based board. Especially, pale colours may be printed on the wood-based board. The disadvantages of printing on a conventional wood-based board having a brown colour are overcome or at least reduced.

Furthermore, by using cellulosic particles in the surface layer, a pale to white surface of the wood-based board may be achieved at a lower cost compared to when using pigment, such as titanium dioxide, to obtain a white surface. The amount of pigment, such as titanium dioxide, can be reduced or eliminated.

Another advantage is that by using cellulosic particles only in the surface layer, a pale to white surface of the wood-based board may be achieved at a lower cost compared to producing a wood-based board of entirely cellulosic particles. The cellulosic particles may be only used where required, i.e., at a surface.

By arranging a pale to white surface layer, the need for covering the wood-based board with a paper or similar in order to reduce the visibility of the core is eliminated, or at least reduced.

By printing directly on the surface of the wood-based board, and since no paper is required to cover the surface of the board, the number of required steps in the manufacturing process is reduced. The cost for producing a wood-based board having for example a printed decorative design is reduced.

The step of pressing, which may include curing, may comprise simultaneously adhering said base layer and the surface layer to each other. Curing may take place by applying heat and pressure to said base layer and/or the surface layer. Thereby, the wood-based board is formed in one step.

The step of pressing, which may include curing, said at least one fibre mat and the second fibre mat may comprise applying heat and pressure, and wherein pressure and/or binder content of the second fibre mat are chosen such that the surface layer remains opaque after curing. Thereby, the base layer remains invisible through the surface layer after curing. The base layer does not shine through the surface layer after curing. If the pressure applied exceeds a certain limit, there is a risk that the surface layer becomes transparent such that the colour of the underlying base layer shines through the surface layer. By adapting the pressure applied to the binder content of the surface layer such that the surface layer still contains air pockets after curing, the surface layer may remain opaque after curing. For example, the surface layer preferably has an opacity of at least 80%.

The step of pressing may comprise curing said at least one first fibre mat into a base layer and the second fibre mat into a surface layer simultaneously.

The method may further comprise printing, preferably by digital printing or rotogravure printing, a print on the surface layer after pressing, which may involve curing. Printing may be performed directly on the surface layer of the wood-based board, without any intervening layers. In one embodiment, a primer may be applied on the surface layer before printing. The primer may comprise pigments such as titanium dioxide.

The method may further comprise printing, preferably by digital printing, a print on the second fibre mat before pressing. A protective layer may be applied on the print before pressing. Thereafter, all layers are pressed together in one step. By providing cellulosic particles in the surface layer, it is possible to print in the surface layer prior to pressing. Since the cellulosic particles are relatively small, void space between the particles is at least reduced, thereby reducing ink drops from permeating into the layer and being displaced during pressing.

Pigment or pigments may be included in the second mix, for example to form a coloured surface layer or such that the pigments are chosen to match the print. For example, it may be desirable to have a slightly grey colour of the print layer. This may be achieved by adding pigments and/or by using a certain amount of recycled fibres.

The carrier may be a conveyor belt, or any other type of conveyor device.

The method may further comprise applying a protective layer on the surface layer. The protective layer may be an overlay sheet, a lacquer layer, a powder overlay comprising wood particles and a binder. The protective layer may be a radiation curing layer such that a UV curing layer. The protective layer may be applied prior or after pressing.

The cellulosic particles of the second mix may be at least partially bleached. By using at least partly bleached particles such as at least partly bleached fibres, the lignin content of the fibres is further reduced.

The lignocellulosic particles of the first mix may be refined wood fibres, wood chips, unrefined wood fibres, wood strands, or sawdust. Depending on the type of lignocellulosic fibres used, the wood-based board obtain properties similar to a MDF, HDF, particle board, OSB etc.

The first binder of the first mix may be a thermosetting resin. The thermosetting binder may be an amino resin. The thermosetting binder may be melamine formaldehyde resin, urea formaldehyde resin, or a combination thereof, or a co-condensation thereof such as MUF (melamine urea formaldehyde). The binder may be an isocyanate resin.

The second binder of the second mix may be a thermosetting resin. The thermosetting binder may be an amino resin. The thermosetting binder may be melamine formaldehyde resin, urea formaldehyde resin, or a combination thereof, or a co-condensation thereof such as MUF (melamine urea formaldehyde). The binder may be an isocyanate resin.

The wood-based board may be a MDF or HDF. If using refined wood fibres, the resulting wood-based board corresponds to a MDF or HDF.

The wood-based board may be a particle board or an OSB. If using wood chips, the resulting wood-based board corresponds to a particle board.

The lignocellulosic material of the first mix may have similar properties as the cellulosic properties of the first mix regarding binder content, humidity etc. The particle size of the lignocellulosic material of the first mix may essentially correspond to the particle size of the cellulosic material of the second mix.

The base layer may comprise a lower base layer and an upper base layer, wherein the particle size of the lignocellulosic particles of the lower base layer is less than the particle size of the lignocellulosic particles of the upper base layer. By using larger particle size of the lignocellulosic particles of the upper base layer, i.e. the layer arranged between the lower base layer and the surface layer, the thickness of the wood-based board may be increased without increasing the weight of the board to the same extent by incorporating air in the upper base layer.

The lignocellulosic material of the lower base layer may have similar properties as the cellulosic properties of the surface layer regarding binder content, humidity etc. The particle size of the lignocellulosic material of the first mix may essentially correspond to the particle size of the cellulosic material of the second mix.

According to a second aspect of the disclosure, a wood-based board is provided. The wood-based board comprises a base layer comprising lignocellulosic particles and a first binder, a surface layer comprising cellulosic particles and a second binder, and wherein the building panel comprises a portion wherein cellulosic particles from the surface layer are mixed with lignocellulosic particles from said base layer.

Embodiments of the second aspect of the disclosure may incorporate all the advantages previously discussed, whereby the previous discussion is applicable also for the wood-based board.

The wood-based board may be a HDF or MDF. Alternatively, the wood-based board may be a particle board or an OSB.

The first binder may be a thermosetting binder, for example, an amino resin.

The second binder may be a thermosetting binder, for example, an amino resin.

The wood-based board may be produced according to the first aspect of the disclosure.

According to a third aspect of the disclosure, a method of manufacturing a wood-based board is provided. The method comprises: applying at least one first fibre mat comprising a first mix comprising lignocellulosic particles and a first binder on a carrier, applying a surface layer comprising cellulosic particles on said at least one first fibre mat prior to pressing said at least one fibre mat, and pressing the surface layer to said at least one first fibre mat, thereby adhering the surface layer to said at least one first fibre mat and forming a wood-based board.

Preferably, pressing comprises applying heat and pressure.

An advantage of embodiments of the present disclosure is that a wood-based board having a pale to white surface is obtained, and for example having a white grade measured according to Berger of more than 80. Thereby, the wood-based board is suitable for being directly printed on. The wood-based board is thereby also suitable for being used as a core for an additional surface layer being at least partly translucent. The wood-based board may also be used without any further treatment. The disadvantages of printing on a conventional wood-based board having a brown colour are overcome or at least reduced by arranging a surface layer comprising cellulosic fibres on the first fibre mat.

Another advantage is that by arranging a surface layer comprising cellulosic particles, a pale to white surface of the wood-based board may be achieved at a lower cost compared to producing a wood-based board of cellulosic particles, or by incorporating pigments in the mix in order to obtain a white surfaces. The cellulosic particles may be only used where required, i.e. at the surface.

Furthermore, the surface layer is attached to the fibre mat in the same step as the fibre mat is pressed into a board. Thereby, no additional step is required to provide the board with a surface layer suitable for being printed on.

The surface layer may comprise a sheet comprising cellulose particles, preferably a paper sheet.

The sheet may be impregnated or unimpregnated. The binder of the first fibre mat may instead impregnate the sheet during pressing. If impregnated, the sheet may be impregnated with a thermosetting binder such as an amino resin.

The sheet may be pigmented. The sheet may, for example, be a white paper.

The step of pressing may comprise curing said at least one first fibre mat into a base layer. Preferably, the surface layer is applied on the first fibre mat prior to curing said at least one first fibre mat.

The method may further comprise printing, preferably by digital printing, a print on the surface layer prior or after pressing.

The carrier may be a conveyor belt.

The first binder may be a thermosetting binder, for example an amino resin. The method may comprise curing the first binder during pressing.

As described above in relation to the first aspect of the disclosure, the surface layer may in one embodiment comprise cellulosic fibres and a second binder applied as first fibre mat.

BRIEF DESCRIPTION OF THE DRAWINGS

The present disclosure will by way of example be described in more detail with reference to the appended schematic drawings, which show embodiments of the present disclosure.

DETAILED DESCRIPTION

Figure 1:
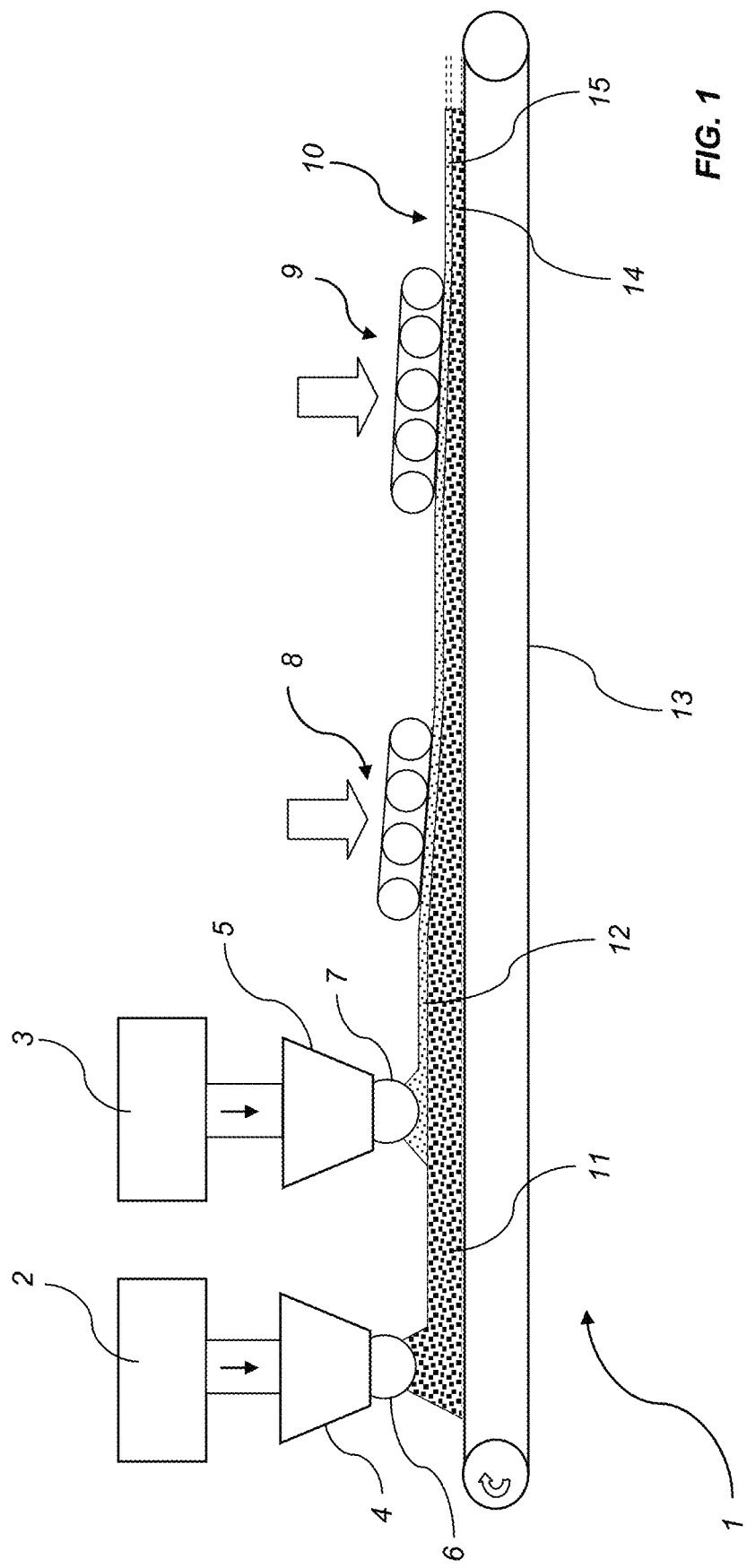
FIG. 1 shows a schematic representation of a method for forming a wood-based board.

FIG. 1 shows a schematic representation of an equipment 1 and method for forming a wood-based board.

The equipment 1 comprises at least two mixing containers 2, 3. In a first mixing container 2, lignocellulosic particles are provided. The lignocellulosic particles comprise lignin. The lignocellulosic particles may be refined wood fibres.

In an embodiment wherein a HDF or MDF is formed, the refined wood fibres may have a length of 0.5-20 mm, preferably 1-10 mm, and a width of 0.01-2 mm, preferably 0.1-1 mm.

In another embodiment wherein a particle board is formed, the lignocellulosic particles are wood chips. A coarse fraction of the wood chips may have a length of 12-20 mm, a width about 4 mm, and thickness about 0.2-0.3 mm. A fine fraction of the wood chips may have a length less than 10 mm, a width about 1-2 mm, and a thickness about 0.1-0.2 mm. A thickness/length ratio for both the fine and the coarse fraction of the wood chips may be 1:100.

In another embodiment wherein an OSB (Oriented Strand Board) is formed, the lignocellulosic particles are wood chips. The wood chips may have a length of about 100 mm, a width about 10-20 mm, and thickness less than 1 mm.

The lignocellulosic particles are mixed with a first binder in the first mixing container 2 to form a first mix. The first binder may be a thermosetting resin, preferably an amino resin. The first binder may be melamine formaldehyde resin, urea formaldehyde resin, phenol formaldehyde resin, or a mix or combination thereof, or a co-condensation thereof such as MUF (melamine urea formaldehyde). Alternatively, the binder may be an isocyanate resin such as PMDI (polymeric methylene diphenyl diisocyanate) or EMDI (emulsifiable methylene diphenyl diisocyanate). Preferably, the lignocellulosic material is mixed with the first binder in a dry state.

In a second mixing container 3, cellulosic particles are provided. The cellulosic particles may be at least partly bleached particles, preferably at least partly bleached wood fibres. The cellulosic particles comprise no lignin, or substantially no lignin. The cellulosic particles may have length of about 50-3000 μm, preferably about 150 μm. The cellulosic particles may have a width of 0.01-2 mm, preferably 0.1-1 mm.

The cellulosic particles are mixed with a second binder in the second mixing container 3 to form a second mix. The second binder may be a thermosetting resin, preferably an amino resin. The second binder may be melamine formaldehyde resin, urea formaldehyde resin, or a mix or combination thereof, or a co-condensation thereof such as MUF (melamine urea formaldehyde). Alternatively, the second binder may be an isocyanate resin such as PMDI (polymeric methylene diphenyl diisocyanate) or EMDI (emulsifiable methylene diphenyl diisocyanate). Preferably, the cellulosic particles are mixed with the binder in a dry state.

Additives, such as catalysts, hydrophobic agents, etc., may be added both to the lignocellulosic particles and to the cellulosic particles. The additives are preferably added to the binder and added to the lignocellulosic and/or cellulosic particles when adding the binder.

The first mix comprising the lignocellulosic particles mixed with the first binder is thereafter fed to a first collecting container 4. The second mix comprising the cellulosic particles mixed with the second binder is fed to a second collecting container 5.

The first mix comprising the lignocellulosic particles is thereafter fed to a first scattering device 6. The first scattering device 6 applies, preferably scatters, the first mix on a carrier 13. The carrier 13 may be a conveyor belt. The first mix forms a first fibre mat 11 adapted to form a base layer 14 comprising lignocellulosic particles.

The second mix comprising the cellulosic particles mixed with the second binder is fed to a second scattering device 7. The second scattering device 7 applies, preferably scatters, the second mix on the first fibre mat 11 formed by the first mix. The second mix comprising the cellulosic particles forms a second fibre mat 12 adapted to form a surface layer 15 comprising cellulosic particles.

Both the first and/or the second mix may be applied as several layers, such that more than one layer forms the first fibre mat 11, and more than one layer forms the second fibre mat 12.

The first fibre mat 11 adapted to form the base layer 14 and the second fibre mat 12 adapted to form the surface layer 15 are thereafter conveyed to a pre-pressing station 8. The first fibre mat 11 and the second fibre mat 12 are pre-pressed, preferably without applying heat (cold pressing).

The first fibre mat 11 may also be pre-pressed before the second fibre mat 12 is applied. As a further alternative, no pre-pressing may take place. However, the second fibre mat is applied to the first fibre mat before final pressing of the first fibre mat. In one embodiment, the second fibre mat is applied to the first fibre mat prior to substantial curing the first fibre mat.

After pre-pressing, the first fibre mat 11 adapted to form the base layer 14 and the second fibre mat 12 adapted to form the surface layer 15 are conveyed to a pressing station 9. The first fibre mat 11 and the second fibre mat 12 are pressed by applying heat and pressure.

In one embodiment, as an example for a continuous press, the temperature may be 180-240° C. Pressure may be applied for 3-10 seconds per mm product thickness. The pressure applied may be varying during the press cycle. Initially, a pressure of about 40 bars may be applied. The pressure is thereafter lowered to about 5 bars. The pressure may be increased towards the end of the press cycle to about 10-15 bars in order to adjust the thickness of the board.

By applying heat and pressure, the first fibre mat 11 and the second fibre mat 12 are pressed simultaneously into a base layer 14 and a surface layer 15, respectively. In one embodiment, the binder of the first and second fibre mat is cured by the pressing step. Simultaneously, the base layer 14 and the surface layer 15 adhere to each other such that a wood-based board 10 is formed.

In one embodiment, no pre-pressing takes place and the first fibre mat 11 and the second fibre mat 12 are directly conveyed to the pressing station 9.

It is also contemplated that more than one first fibre mat may be applied on the carrier to form more than one base layer.

Figure 2A:
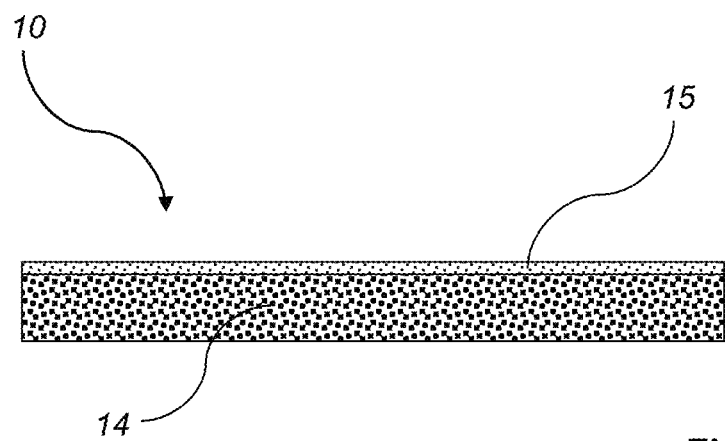
FIG. 2a shows an embodiment of a wood-based board.

As shown in FIG. 2a, the wood-based board 10 thereby formed comprises a base layer 14 comprising lignocellulosic particles and a surface layer 15 comprising cellulosic particles. Depending on the type of particles used for the base layer 14, the wood-based board may be a HDF, MDF, particle board, OSB etc. If the lignocellulosic particles are refined fibres, the wood-based board forms a MDF or HDF. If the lignocellulosic particles are wood chips, the wood-based board forms a particle board. Common for all embodiments is that the cellulosic particles of the surface layer 15 forms a surface layer of the wood-based board 10. The surface layer 15 may have a pale to white colour.

Since the first fibre mat 11 and the second fibre mat 12 are pressed simultaneously to form the base layer 14 and the surface layer 15, and simultaneously adhered to each other, a portion wherein cellulosic particles form the surface layer 15 are mixed with lignocellulosic particles from the base layer 14 is formed.

About 200 g/m² or more of the second mix may be applied for forming the surface layer 15.

Figure 2B:
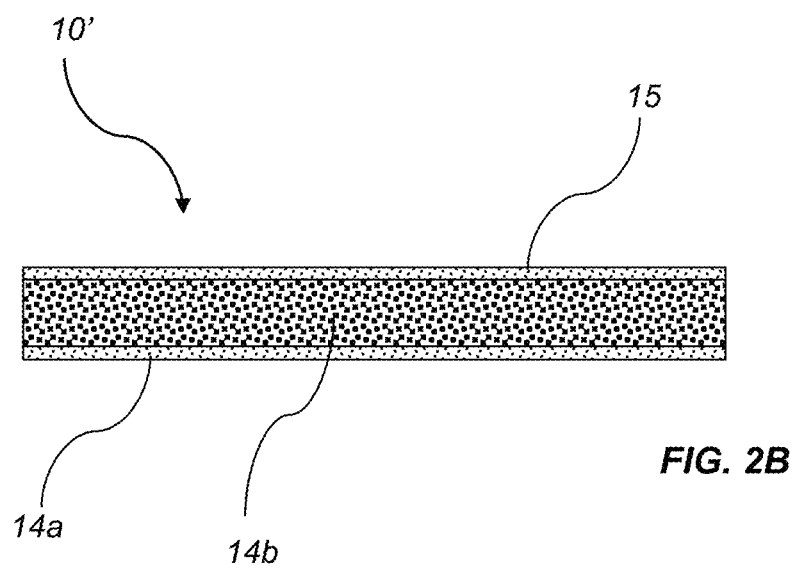
FIG. 2b shows an embodiment of a wood-based board.

In FIG. 2b, a wood-based board 10' comprises a lower base layer 14a comprising lignocellulosic particles, an upper base layer 14b comprising lignocellulosic particles, and a surface layer 15 comprising cellulosic particles. The lignocellulosic particles of the lower and upper base layer 14a, 14b may be wood chips. The wood-based board 10' may thus be a particle board having an integrated surface layer of cellulosic particles.

Since the two first fibre mats and the second fibre mat 12 are pressed simultaneously to form the lower base layer 14a, the upper base layer 14b and the surface layer 15, and simultaneously adhered to each other, a portion wherein cellulosic particles form the surface layer 15 are mixed with lignocellulosic particles from the upper base layer 14b is formed.

The lower base layer 14a and the surface layer 15 may have similar properties concerning dimensional stability and resistance to moisture.

The particle size of the lignocellulosic particles of the lower base layer 14a and of the upper base layer 14b, respectively, may differ. In one embodiment, the particle size of the lower base layer 14a corresponds to the particle size of the cellulosic particles of the surface layer 15. The particle of the lower base layer 14a and of the surface layer 15 may have a length less than 10 mm, a width about 1-2 mm, and a thickness about 0.1-0.2 mm. The upper base layer 14b, arranged between the lower base layer 14a and the surface layer 15, may have a particle size exceeding the particle size of the lower base layer 14a. In case of a particle board, the upper base layer 14b may comprise coarse wood chips having a length of 12-20 mm, a width about 4 mm, and thickness about 0.2-0.3 mm. Thereby, a three layer wood-based board 10' is obtained, for example a three layer particle board.

Figure 2C:
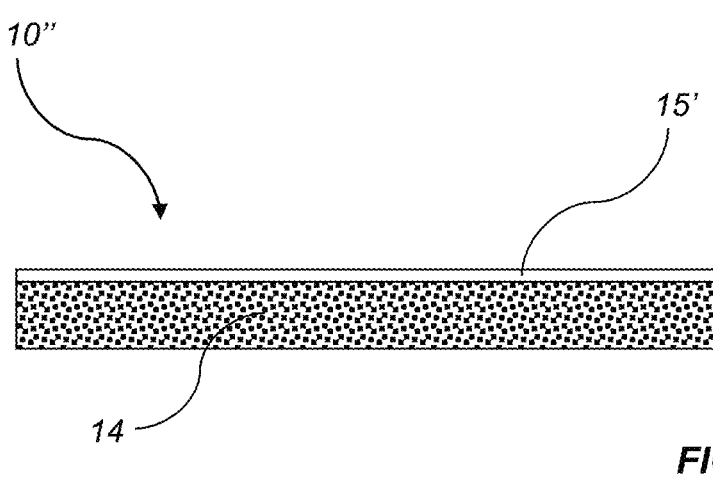
FIG. 2c shows an embodiment of a wood-based board.

In one embodiment of a wood based board 10", which is shown in FIG. 2c, the second fibre mat 12 is replaced by a surface layer 15' comprising cellulosic particles, preferably comprising a sheet such as a paper sheet. A first fibre mat 11 is applied on a carrier 13 as described above with reference to FIG. 1. Instead of applying a second fibre mat 12, a surface layer 15' is applied on the first fibre mat 11. The surface layer 15' may comprise a sheet comprising cellulosic particles, such as a paper sheet. The paper sheet may be an impregnated or an unimpregnated paper sheet. If impregnated, the sheet may comprise a thermosetting binder such as an amino resin. When pressing the paper sheet on the first fibre mat 12 comprising the first binder, the first binder may impregnate the surface layer 15' simultaneously as adhering the surface layer to the first fibre mat 11. The sheet may be printed prior or after being pressed to the first fibre mat 11. The sheet may be pigmented such as a white paper.

The wood-based board 10, 10', 10" as described above may be cut or sawn to a desired shape and size. The surface layer 15, 15' of the wood-based board 10, 10', 10" may be ground. The surface layer 15, 15' may be subjected to corona treatment. The wood-based board 10, 10', 10" may be used without any further surface layer or decorative print as a wood-based board 10, 10', 10" having a pale to white surface. Alternatively, a décor layer may be attached to the wood-based board 10, 10', 10". Due to the surface layer of cellulosic particles, a thin and/or pale décor layer may be used without any risk that the colour of the wood-based board 10, 10', 10" shines through the décor layer.

A print may be printed directly on the surface 15, 15' of the wood-based board 10, 10', 10" of the above described type. The surface layer 15, 15' of cellulosic particles forms a print layer integrated in the wood-based board 10, 10', 10". The print is preferably applied by means of digital printing. The digital printing device may comprise a Drop-on-Demand (DOD) inkjet printer, preferably a piezoelectric DOD inkjet printer. Preferably, the ink is an aqueous ink, but solvent based and UV curing inks may also be used. A print may also be applied by other suitable means such as rotogravure. A print may also be applied by dry particles used as colorants to create a digital image as described in IPCOM000224950D published Jan. 15, 2013 at ip.com.

The print may be printed prior or after pressing of the first and second fibre mats 11, 12. In one embodiment, the print is printed into the second fibre mat 12 prior to pressing. However, the second fibre mat 12 may be pre-pressed prior to pressing. The printed second fibre mat 12 is thereafter pressed. In another embodiment, the print is printed on the surface layer 15, 15' after pressing, and preferably after curing.

The print may be a decorative design or a fantasy pattern. The decorative design may be natural designs and patterns such as a wood pattern or stone patterns.

The second mix forming the surface layer 15 may comprise pigment or pigments such that a coloured surface layer 15 is obtained. Thereby, a wood-based board 10, 10' having a coloured surface layer 15 is obtained. The wood-based board 10, 10' can be used without any additional paint layers and/or décor foils. A coloured surface layer 15 can be combined with a print as described above.

A protective layer or coating (not shown) may be applied on the surface 15, 15' of the wood-based board 10, 10', 10" according to any embodiment described above. The protective coating may be applied on a decorative print printed on the surface 15 of the wood-based board 10, 10', 10". The protective coating may be an overlay paper such as a resin impregnated paper, preferably comprising wear resistant particles such as aluminium oxide particles, for example, corundum. The protective coating may be a powder overlay comprising a binder in powder form and preferably cellulosic particles and wear resistant particles such as aluminium oxide particles, for example, corundum. The protective coating may be a radiation curing coating such as electron beam curing coating or UV curing coating. The protective coating may comprise acrylate or methacrylate polymers.

The protective coating may be applied prior or after pressing. In one embodiment, the protective coating is applied on the second fibre mat 12 prior to pressing, with an optional print thereon, and the first fibre mat 11, the second fibre mat 12 are pressed together in one step.

The wood-based board 10, 10', 10" may be used as a building panel, for example as floor panel, a wall panel, a furniture panel. The building panel may be provided with a mechanical locking system for locking building panels to each other. The mechanical locking system may be of the type described in WO 2007/015669, WO 2008/004960, WO 2009/116926, or WO 2010/087752.

It is contemplated that there are numerous modifications of the embodiments described herein, which are still within the scope of the disclosure. It is for example contemplated that more than one base layer of lignocellulosic particles may be provided, and that more than one surface layer of cellulosic particles may be provided.

Examples

Example 1

Three different blends have been prepared. 750 g of a lower base layer comprising wood flour (200-600 μm) and 15% melamine-formaldehyde resin was scattered on a carrier to form a first layer of a first fibre mat. 2250 g of an upper base layer comprising wood particles (2 cm in length, 0.5 cm in width) and 12% melamine-formaldehyde resin, was scattered on the first layer of the first fibre mat to form a second layer of the first fibre mat. Another 750 g of a white surface layer comprising cellulosic fibres (150 μm) and 15% melamine-formaldehyde resin, was scattered on top of the second layer of the first fibre mat to form a second fibre mat. The first fibre mat and the second fibre mat were prepressed cold and moved into a hot press, pressing with 180° C. in 135 seconds at 10 bar. The product was a 900×700×8 mm particle board with a density of about 750 kg/m3 and a printable white surface layer.

Example 2

A particle board in the dimension of 200×120×9 mm (density 900 kg/m3) was formed by 41 g lower base layer, 120 g upper base layer and 41 g white surface layer. The lower base layer comprises wood flour (200-600 μm), 4% hydrophobing agent, 15% melamine-formaldehyde resin and 2% hardener (calculated on the amount of resin). The upper base layer comprises wood particles (2 cm in length, 0.5 cm in width), 4% hydrophobing agent, 12% melamine-formaldehyde resin and 2% hardener (calculated on the amount of resin). The white surface layer comprises cellulosic particles (150 μm), 4% hydrophobing agent, 15% melamine-formaldehyde resin and 2% hardener (calculated on the amount of resin). The layers have been scattered on a carrier to a first fibre mat and a second fibre mat, pre-pressed cold and moved into a hot press. The first and the second fibre mats were pressed in 180° C. for 100 seconds in an initial pressure of 40 bar for 5 seconds, a pressure of 5 bar during 85 seconds and finally a pressure of 10 bar for 10 seconds.

Embodiments

1. A method of manufacturing a wood-based board, comprising:
applying at least one first fibre mat, comprising a first mix comprising lignocellulosic particles and a first binder, on a carrier,
applying a second fibre mat, comprising a second mix comprising cellulosic particles and a second binder, on said at least one first fibre mat, and
pressing said at least one first fibre mat into a base layer and the second fibre mat into a surface layer simultaneously, thereby forming a wood-based board.

2. The method according to embodiment 1, wherein the step of pressing comprises simultaneously adhering said base layer and the surface layer to each other.

3. The method according to embodiment 1, wherein the step of pressing said at least one fibre mat and the second fibre mat comprises applying heat and pressure, and wherein pressure and/or binder content of the second fibre mat are chosen such that the surface layer remains opaque after curing.

4. The method according to embodiment 1, wherein pressing comprises curing said at least one first fibre mat into a base layer and the second fibre mat into a surface layer simultaneously.

5. The method according to embodiment 1, further comprising printing a print on the second fibre mat before pressing.

6. The method according to embodiment 1, further comprising printing a print on the surface layer after pressing.

7. The method according to embodiment 1, wherein the carrier is a conveyor belt.

8. The method according to embodiment 1, further comprising applying a protective layer on the surface layer.

9. The method according to embodiment 1, wherein the cellulosic particles of the second mix are at least partially bleached.

10. The method according to embodiment 1, wherein the lignocellulosic particles of the first mix are refined wood fibres, wood chips, unrefined wood fibres, wood strands, or saw dust.

11. The method according to embodiment 1, wherein the first binder is a thermosetting resin.

12. The method according to embodiment 1, wherein the second binder is a thermosetting resin.

13. The method according to embodiment 1, wherein the wood-based board is a MDF or HDF.

14. The method according to embodiment 1, wherein the wood-based board is a particle board or an oriented strand board.

15. A wood-based board, comprising
abase layer comprising lignocellulosic particles and a first binder,
a surface layer comprising cellulosic particles and a second binder, and
wherein the building panel comprises a portion wherein cellulosic particles from the surface layer are mixed with lignocellulosic particles from said base layer.

16. A wood-based board according to embodiment 15, wherein the wood-based board is a HDF or MDF.

17. A wood-based board according to embodiment 15, wherein the wood-based board is a particle board or an oriented strand board.

18. A wood-based board according to embodiment 15, wherein the first binder is a thermosetting binder.

19. A wood-based board according to embodiment 15, wherein the second binder is a thermosetting binder.

20. A method of manufacturing a wood-based board, comprising:
applying at least one first fibre mat comprising a first mix comprising lignocellulosic particles and a first binder on a carrier,
applying a surface layer comprising cellulosic particles on said at least one first fibre mat prior to pressing the at least one first fibre mat, and
pressing the surface layer to said at least one first fibre mat, thereby adhering the surface layer to said at least one first fibre mat and forming a wood-based board.

21. The method according to embodiment 20, wherein the surface layer comprises a sheet.

22. The method according to embodiment 20, wherein the surface layer comprises a second fibre mat comprising cellulosic particles and a second binder.

23. The method according to embodiment 20, wherein pressing comprises curing said at least one first fibre mat into a base layer.

24. The method according to embodiment 20, further comprising printing a print on the surface layer before or after pressing.

25. The method according to embodiment 20, wherein the carrier is a conveyor belt.

26. The method according to embodiment 20, wherein the first binder is a thermosetting binder.

The invention claimed is:

1. A method of manufacturing a wood-based board, comprising:
applying at least one first fibre mat, comprising a first mix comprising lignocellulosic particles and a first binder, on a carrier,
applying a second fibre mat, comprising a second mix comprising cellulosic particles and a second binder, on said at least one first fibre mat, and
pressing said at least one first fibre mat into a base layer and the second fibre mat into a surface layer simultaneously, thereby forming a wood-based board,
wherein the cellulosic particles of the second mix possess less than 5% lignin.

2. The method according to claim 1, wherein the step of pressing comprises simultaneously adhering said base layer and the surface layer to each other.

3. The method according to claim 1, wherein the step of pressing said at least one fibre mat and the second fibre mat comprises applying heat and pressure.

4. The method according to claim 1, wherein pressure and/or binder content of the second fibre mat are chosen such that the surface layer remains opaque after curing.

5. The method according to claim 1, wherein the step of pressing comprises curing said at least one first fibre mat into the base layer and the second fibre mat into the surface layer simultaneously.

6. The method according to claim 1, further comprising printing a print on the second fibre mat before pressing.

7. The method according to claim 1, further comprising printing a print on the surface layer after pressing.

8. The method according to claim 1, further comprising applying a protective layer on the surface layer.

9. The method according to claim 1, wherein the cellulosic particles of the second mix are at least partially bleached.

10. The method according to claim 1, wherein the lignocellulosic particles of the first mix are refined wood fibres, wood chips, unrefined wood fibres, wood strands, or saw dust.

11. The method according to claim 1, wherein the first binder is a thermosetting resin.

12. The method according to claim 1, wherein the second binder is a thermosetting resin.

13. The method according to claim 1, wherein the second mix comprises a pigment to form a coloured surface layer, wherein the pigment is not titanium dioxide.

14. The method according to claim 1, wherein the second mix comprises a first pigment and a second pigment, wherein the first pigment is titanium dioxide.

15. The method according to claim 1, wherein the surface layer of the wood-based board has a white grade of more than 80 on a Berger color scale.

16. A method of manufacturing a wood-based board, comprising:
- applying at least one first fibre mat comprising a first mix comprising lignocellulosic particles and a first binder on a carrier,
- applying a surface layer comprising cellulosic particles on said at least one first fibre mat prior to pressing the at least one first fibre mat, and pressing the surface layer to said at least one first fibre mat, thereby adhering the surface layer to said at least one first fibre mat and forming a wood-based board,
- wherein the cellulosic particles of the second mix possess less than 5% lignin.

17. The method according to claim 16, wherein the surface layer comprises a paper sheet.

18. The method according to claim 16, wherein the surface layer comprises a second fibre mat comprising cellulosic particles and a second binder.

19. The method according to claim 16, wherein pressing comprises curing said at least one first fibre mat into a base layer.

20. The method according to claim 16, further comprising printing a print on the surface layer before or after pressing.

21. The method according to claim 16, wherein the first binder is a thermosetting binder.

22. A method of manufacturing a wood-based board, comprising:
- applying at least one first fibre mat, comprising a first mix comprising lignocellulosic particles and a first binder, on a carrier,
- applying a second fibre mat, comprising a second mix comprising cellulosic particles and a second binder, on said at least one first fibre mat, and
- pressing said at least one first fibre mat into a base layer and the second fibre mat into a surface layer simultaneously, thereby forming a wood-based board, and
- wherein the second mix is pigment free, wherein the cellulosic particles of the second mix possess less than 5% lignin.

* * * * *